US012785219B2

(12) United States Patent
Lu et al.

(10) Patent No.: US 12,785,219 B2
(45) Date of Patent: Nov. 3, 2026

(54) BARE CELL, CYLINDRICAL BATTERY AND ASSEMBLY METHOD OF BARE CELL

(71) Applicant: 03;JIANGSU ZENERGY BATTERY TECHNOLOGIES GROUP CO., LTD., Changshu Suzhou City (CN)

(72) Inventors: Juntai Lu, Changshu Suzhou City (CN); Jianliang Wei, Changshu Suzhou City (CN); Yongjun Li, Changshu Suzhou City (CN); Yehui Jiao, Changshu Suzhou City (CN); Dandan Chen, Changshu Suzhou City (CN); Maopeng Ye, Changshu Suzhou City (CN)

(73) Assignee: JIANGSU ZENERGY BATTERY TECHNOLOGIES GROUP CO., LTD., Changshu Suzhou (CN)

( * ) Notice: Subject to any disclaimer, the term of this patent is extended or adjusted under 35 U.S.C. 154(b) by 650 days.

(21) Appl. No.: 18/207,028

(22) Filed: Jun. 7, 2023

(65) Prior Publication Data

US 2023/0402724 A1 Dec. 14, 2023

(30) Foreign Application Priority Data

Jun. 8, 2022 (CN) ......................... 202210642163.4
Dec. 14, 2022 (CN) ......................... 202211607424.5

(51) Int. Cl.
*H01M 50/533* (2021.01)
*H01M 10/0525* (2010.01)
(Continued)

(52) U.S. Cl.
CPC ..... *H01M 50/533* (2021.01); *H01M 10/0587* (2013.01); *H01M 50/107* (2021.01);
(Continued)

(58) Field of Classification Search
CPC ............. H01M 50/533; H01M 50/107; H01M 50/152; H01M 50/531; H01M 50/538;
(Continued)

(56) References Cited

U.S. PATENT DOCUMENTS

2021/0043915 A1* 2/2021 Mantoku ............. H01M 50/583
2021/0242549 A1* 8/2021 Zheng ................. H01M 50/209
(Continued)

FOREIGN PATENT DOCUMENTS

CN 206250267 U 6/2017
CN 209169206 U 7/2019
(Continued)

*Primary Examiner* — Eugenia Wang
(74) *Attorney, Agent, or Firm* — The Sun IP Law

(57) ABSTRACT

Disclosed are a bare cell, a cylindrical battery and an assembly method of the bare cell. The bare cell is formed a cylinder by stacking and winding a first electrode plate, a separator and a second electrode plate, the polarity of the first electrode plate is opposite to the polarity of the second electrode plate, at least one of the first electrode plate and the second electrode plate forms a plurality of tabs at at least one end of the cylinder in an axial direction, each of the plurality of tabs is provided with at least one die-cutting line to form a plurality of sub-tabs, the plurality of tabs are bent and flattened in a radial direction, and the plurality of sub-tabs of two adjacent layers of the plurality of tabs are arranged in a staggered manner.

13 Claims, 3 Drawing Sheets

(51) Int. Cl.

| | |
|---|---|
| ***H01M 10/0587*** | (2010.01) |
| ***H01M 50/107*** | (2021.01) |
| ***H01M 50/152*** | (2021.01) |
| ***H01M 50/531*** | (2021.01) |
| ***H01M 50/538*** | (2021.01) |

(52) U.S. Cl.
CPC ....... *H01M 50/152* (2021.01); *H01M 50/531* (2021.01); *H01M 50/538* (2021.01); *H01M 10/0525* (2013.01)

(58) Field of Classification Search
CPC .......... H01M 10/0587; H01M 10/0525; Y02E 60/10; Y02P 70/50
See application file for complete search history.

(56) References Cited

U.S. PATENT DOCUMENTS

| | | | | |
|---|---|---|---|---|
| 2024/0372153 | A1* | 11/2024 | Chai | H01M 50/593 |
| 2024/0396181 | A1* | 11/2024 | Deng | H01M 50/538 |

FOREIGN PATENT DOCUMENTS

| | | | |
|---|---|---|---|
| CN | 110323403 | A | 10/2019 |
| CN | 110828770 | A | 2/2020 |
| CN | 113193165 | A | 7/2021 |
| WO | 2022052120 | A1 | 3/2022 |

* cited by examiner

BARE CELL, CYLINDRICAL BATTERY AND ASSEMBLY METHOD OF BARE CELL

CROSS-REFERENCE TO RELATED APPLICATION

The disclosure claims priority to and the benefits of Chinese Patent Application No. 202210642163.4, filed to the China National Intellectual Property Administration (CHIPA) on 8 Jun. 2022, and Chinese Patent Application No. 202211607424.5, filed to the China National Intellectual Property Administration (CHIPA) on 14 Dec. 2022, which are hereby incorporated by reference in their entireties.

TECHNICAL FIELD

The disclosure relates to the technical field of batteries, and in particularly to a bare cell, a cylindrical battery and an assembly method of the bare cell.

BACKGROUND

At present, the application of lithium-ion batteries is becoming more and more extensive, which puts forward higher requirements on the performance of batteries. Due to a standardized production process, high production efficiency, excellent cycle performance and good consistency, cylindrical lithium-ion batteries have been widely used in automotive power batteries in recent years. A positive plate of a cylindrical power lithium-ion battery mostly adopts a middle tab design to reduce internal resistance and improve performance. With the development of new energy vehicles, batteries with high energy density have become a development trend. Cylindrical batteries have high group efficiency and good consistency, and have broad application prospects.

A tab kneading process is applied to an existing cylindrical battery technology, that is, the tab is kneaded into a plane by the tab kneading process first, and then a bus bar and the kneaded tab are welded together by laser spot welding. This method is very prone to causing a short circuit of the battery, thus the product safety is accordingly reduced.

SUMMARY

The disclosure aims, in view of deficiencies in the related art, to provide a bare cell, a cylindrical battery and an assembly method of the bare cell. An overall structure of the cylindrical battery is improved, so that a tab kneading process is not needed in a manufacturing process of the cylindrical battery to solve the problems above mentioned.

In order to achieve the above object, the disclosure adopts the following technical solution: a bare cell is formed a cylinder by stacking and winding a first electrode plate, a separator and a second electrode plate, the polarity of the first electrode plate is opposite to the polarity of the second electrode plate, and the cylinder has a radial direction and an axial direction; and at least one of the first electrode plate and the second electrode plate forms a plurality of tabs at at least one end of the cylinder in the axial direction, the plurality of tabs are arranged in the axial direction, each of the plurality of tabs is provided with at least one die-cutting line so that each of the plurality of tabs is formed with a plurality of sub-tabs, the plurality of tabs are bent and flattened in the radial direction, and the plurality of sub-tabs of two adjacent tabs of the plurality of tabs are arranged in a staggered manner.

In some embodiments, the first electrode plate is provided with a first tab, the second electrode plate is provided with a second tab, the first tab and the second tab are located at the same end of the cylinder, the first tab of the first electrode plate is located in a first area, the second tab of the second electrode plate is located in a second area, and a gap portion is formed between the first area and the second area.

In some embodiments, between any two adjacent tabs of the plurality of tabs, the layer of tab close to a circle center of the cylinder is below the layer of tab away from the circle center of the cylinder.

The disclosure further provides a cylindrical battery, which includes: a housing, at least one end of the housing is provided with an opening; a cover plate assembly, there is at least one cover plate assembly, and the cover plate assembly covers the opening and is connected to the housing in a sealed manner; the above bare cell, the bare cell is arranged inside the housing; and a current collector assembly, there is at least one current collector assembly, and the current collector assembly is correspondingly arranged at one or two ends of the bare cell in the axial direction; a first electrode plate is provided with a first tab; and a second electrode plate is provided with a second tab.

In some embodiments, there is one cover plate assembly, both the first electrode plate and the second electrode plate form a plurality of tabs close to one end of the cover plate assembly, and the first tab and the second tab are located at the same end of the bare cell.

In some embodiments, there are two current collector assemblies, which are arranged at two ends of the bare cell in the axial direction, the first electrode plate and the second electrode plate respectively form a plurality of tabs at two ends of the bare cell in the axial direction, and the first tab and the second tab are located at two ends of the bare cell.

In some embodiments, there is one current collector assembly, which is arranged at one end of the bare cell in the axial direction. The current collector assembly includes a first conductive portion, a second conductive portion and an insulating connection portion arranged between the first conductive portion and the second conductive portion. The first conductive portion is connected to the first tab, and the second conductive portion is connected to the second tab.

In some embodiments, the first conductive portion and the second conductive portion both include a first annular plane, a second annular plane and an arc-shaped surface connected between the first annular plane and the second annular plane, the arc-shaped surface is inclined, and the orthographic projection of the first annular plane does not coincide with the orthographic projection of the second annular plane.

In some embodiments, a surface, away from the bare cell, of the first conductive portion and/or the second conductive portion extend outward in part and protrude to form a convex body, and the convex body is located in an area of the arc-shaped surface.

In some embodiments, the cover plate assembly includes a positive terminal, a negative terminal and a connecting piece arranged between the positive terminal and the negative terminal, the positive terminal and/or the negative terminal protrude in part in a direction away from the bare cell to form a convex portion, the interior of which is hollow, and the convex portion is matched with the convex body.

In some embodiments, the positive terminal and/or the negative terminal are in part dented in a direction close to the bare cell to form a concave portion, and the concave portion abuts against the arc-shaped surface.

In some embodiments, the first tab is located in a first area, the second tab is located in a second area, and an insulating part is arranged between the first area and the second area.

In some embodiments, the insulating part is an insulating glue bonded between the first area and the second area.

The disclosure further provides an assembly method of the bare cell, which includes:

When die-cutting a tab, flattening the tab so that the tab is inclined to one side and forms an angle with an electrode plate;

stacking and winding a first electrode plate, a separator and a second electrode plate to form a cylinder, bending and flattening the tab in a radial direction of the cylinder to form a plurality of tabs, and the plurality of tabs are arranged in an axial direction, each of the plurality of tabs is provided with at least one die-cutting line so that each of the plurality of tabs is formed with a plurality of sub-tabs, and the plurality of sub-tabs of two adjacent tabs of the plurality of tabs are arranged in a staggered manner.

The disclosure has the beneficial effects that: the disclosure provides the bare cell, which is formed the cylinder by stacking and winding the first electrode plate, the separator and the second electrode plate, the polarity of the first electrode plate is opposite to the polarity of the second electrode plate, and the cylinder has the radial direction and the axial direction; and at least one of the first electrode plate and the second electrode plate forms the plurality of tabs at at least one end of the cylinder in the axial direction, the plurality of tabs are arranged in the axial direction, each of the plurality of tabs is provided with at least one die-cutting line so that each of the plurality of tabs is formed with the plurality of sub-tabs, the plurality of tabs are bent and flattened in the radial direction, and the plurality of sub-tabs of two adjacent tabs of the plurality of tabs are arranged in a staggered manner. According to the disclosure, a tab located at one end of the bare cell is spread inwards in the radial direction of the bare cell in a flattening manner, so that a kneading process is not needed in a manufacturing process of the cylindrical battery, and a risk that the tab is shattered when the tab is processed by kneading is avoided.

BRIEF DESCRIPTION OF THE DRAWINGS

The features, advantages, and technical effects of embodiments of the disclosure will be described below with reference to the accompanying drawings.

Figure 1:
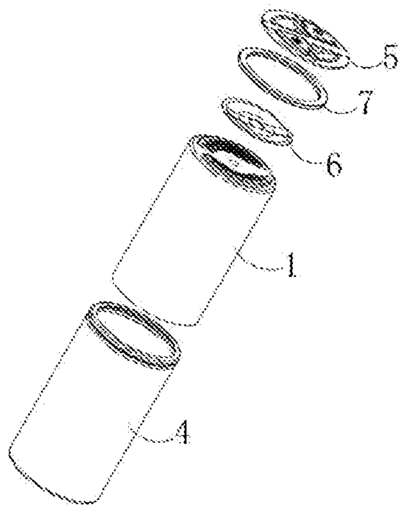
FIG. 1 is an explosive view of a cylindrical battery according to an embodiment of the disclosure.

Illustration of the following drawing marks:

1. bare cell; 2. tab; 21. first tab; 22. second tab; 3. gap portion; 4. housing; 5. cover plate assembly; 51*a*. positive terminal; 51*b*. negative terminal; 51*c*. connecting piece; 52. convex portion; 53. concave portion; 6. current collector assembly; 61*a*. first conductive portion; 61*b*. second conductive portion; 61*c*. insulating connection portion; 62*a*. first annular plane; 62*b*. second annular plane; 62*c*. arc-shaped surface; 63. convex body; 7. sealing ring; 8. injection port; 9. tab area; and 10. non-tab area.

DETAILED DESCRIPTION OF THE EMBODIMENTS

Certain terms are used, for example, in the detailed description and claims to refer to particular assemblies. Those skilled in the art should understand that a hardware manufacturer may use different terms to refer to the same assembly. The detailed description and claims do not use the difference in name as a way to distinguish assemblies, but use the difference in function of assemblies as a criterion for distinguishing. As mentioned throughout the detailed description and claims, “comprising” is an open term, so it should be interpreted as “including but not limited to”. “Approximately” means that within an acceptable error range, those skilled in the art can solve technical problems within a certain error range and basically achieve technical effects.

In the descriptions of the disclosure, it is to be understood that the orientation or location relationships indicated by the terms “upper”, “lower”, “front”, “back”, “left”, “right” and “horizontal” are orientation or location relationships shown on the basis of the drawings, which are only for the convenience of describing the disclosure and simplifying the descriptions, rather than indicating or implying that the referred apparatuses or elements must have a specific orientation, and be constructed and operated in the specific orientation. Therefore, it cannot be understood as a limitation of the disclosure.

In the description of the disclosure, unless otherwise clearly specified and limited, terms “first”, “second”, and “third” are only used for the purpose of description, and cannot be understood as indicating or implying relative importance; a term “multiple” refers to two or more; unless otherwise specified or stated, terms “connection” and “fixing” should be interpreted in a broad sense, for example, “connecting” may be fixed connection, or detachable connection, or integral connection, or electric connection; and “connection” may be direct connection, or indirect connection through an intermediary. Those of ordinary skill in the art may understand the specific meanings of the terms in the disclosure according to specific conditions.

The disclosure will be described in further detail below in conjunction with accompanying FIGS. 1-10, but is not limited thereto.

In a manufacturing process of a cylindrical battery, before a collector plate is welded, it is necessary to knead and shape an end face formed by a tab of a bare cell.

In the related art, tab kneading manners mainly include a mechanical kneading manner and an ultrasonic kneading manner. In the mechanical kneading manner, a tab is kneaded mostly by axial movement, which will lead to inconsistencies in the direction where the tab is pressed down, and the tab is deformed, thus easily causing tab eversion. Once the everted tab enters a housing, an everted edge of the tab will scratch the housing and cause a short circuit with the housing, thus causing battery failure and incapability to satisfy a safety standard. Therefore, the ultrasonic kneading manner is generally adopted to process the tab-position end face formed by the tab. However, during kneading, it is to be found that the ultrasonic kneading manner causes the tab to be shattered, especially a positive aluminum foil, and an end face where the positive aluminum foil is located produces metal debris. If the metal debris is not disposed of in time, physical self-discharge of the bare cell will increase, and the metal debris even enters the interior of the bare cell to cause a short circuit between a positive electrode plate and a negative electrode plate, or is scatters the interior of a device, resulting in cross-contamination.

Figure 2:
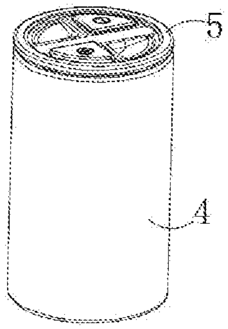
FIG. 2 is a structural schematic diagram of a cylindrical battery according to an embodiment of the disclosure.
Figure 3:
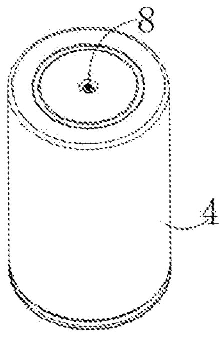
FIG. 3 is another structural schematic diagram of a cylindrical battery according to an embodiment of the disclosure.

Based thereon, some embodiments of the disclosure provide a cylindrical battery. Referring to FIGS. 1-3, the cylindrical battery includes a housing 4, a cover plate assembly 5, a bare cell 1 and a current collector assembly 6. At least one end of the housing 4 is provided with an opening. The cover plate assembly 5 covers the opening and is connected to the housing 4 in a sealed manner. The bare cell 1 is arranged inside the housing 4. The current collector assembly 6 is arranged at one or two ends of the bare cell 1 in an axial direction. A first electrode plate is provided with a first tab 21, and a second electrode plate is provided with a second tab 22.

In some embodiments, the bare cell 1 is formed a cylinder by stacking and winding the first electrode plate, a separator and the second electrode plate, the polarity of the first electrode plate is opposite to the polarity of the second electrode plate, and the cylinder has a radial direction and an axial direction. At least one of the first electrode plate and the second electrode plate forms a plurality of tabs at at least one end of the cylinder in the axial direction, the plurality of tabs are arranged in the axial direction, and each of the plurality of tabs is provided with at least one die-cutting line so that each of the plurality of tabs is formed with a plurality of sub-tabs, the plurality of tabs are bent and flattened in the radial direction, and the plurality of sub-tabs of two adjacent tabs of the plurality of tabs are arranged in a staggered manner. More specifically, between any two adjacent tabs of the plurality of tabs, the layer of tab close to a circle center of the cylinder is below the layer of tab away from the circle center of the cylinder.

Figure 4:
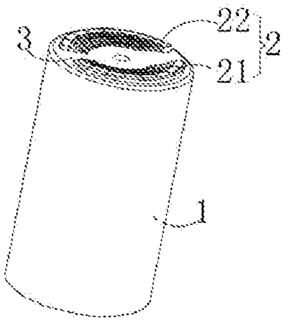
FIG. 4 is a structural schematic diagram of a bare cell according to an embodiment of the disclosure.

As shown in FIG. 4, at least one end of the bare cell 1 leads out n tabs, n, and the n tabs are flattened inwards in the radial direction of the bare cell 1, so that the plurality of tabs are formed on an end face of the bare cell 1, the plurality of tabs are arranged in the axial direction, and each of the plurality of tabs is provided with at least one die-cutting line so that each of the plurality of tabs is formed with the plurality of sub-tabs, and the plurality of sub-tabs of two adjacent tabs of the plurality of tabs are arranged in a staggered manner.

In some embodiments, before the current collector assembly 6 is welded, tabs of the bare cell 1 are shaped by a flattening manner, so that the tabs are arranged in staggered manner in the radial direction of the bare cell 1. When the tabs are arranged on a corresponding flattening tool in a penetrating manner, under flattening force of the flattening tool, the tabs are spread directly above the bare cell 1, and are inwards spread in a stepped shape in the radial direction of the bare cell 1, which is no need for kneading and other processing, thereby avoiding a risk of metal debris generated by kneading.

In some embodiments, upper and lower ends of the housing 4 are provided with openings. Correspondingly, the bare cell 1 leads out the first tab 21 and the second tab 22 from upper and lower ends of the bare cell 1 respectively, and then the first tab 21 and the second tab 22 located at the upper and lower ends of the bare cell 1 are flattened respectively, so that the first tab 21 and the second tab 22 are respectively spread on two ends of the bare cell 1.

It is to be found that a tab of a traditional cylindrical battery is usually connected to a top cover by leading out the tab to be welded with the top cover. This manner has weak current passing capability, and tabs are led out from two ends of the traditional cylindrical battery, which wastes battery space and affects an increase in battery energy density.

Based thereon, the disclosure further improves a structure of the cylindrical battery. Referring to FIG. 4, the first tab 21 and the second tab 22 are led out from the same end of the bare cell 1, and a gap portion 3 is arranged between the first tab 21 and the second tab 22. The gap portion 3 extends in the radial direction of the bare cell 1, and an insulating part is arranged in the gap portion 3 to insulate the first tab 21 and the second tab 22. More specifically, the first tab 21 is formed by extending an empty foil area of the first electrode plate outward, and the second tab 22 is formed by extending an empty foil area of the second electrode plate outward. The first tab 21 and the second tab 22 are located at the same end of the cylinder. The first tab 21 of the first electrode plate is located in a first area, the second tab 22 of the second electrode plate is located in a second area, and the gap portion 3 is formed between the first area and the second area.

In some embodiments of the disclosure, one end of the bare cell 1 leads out the first tab 21 and the second tab 22, the first tab 21 and the second tab 22 are respectively inwards flattened in the radial direction of the bare cell 1, and are arranged in the stepped shape in the radial direction of the bare cell 1, so that the kneading process is not needed in the manufacturing process of the cylindrical battery, and then a risk of shattering a tab when the tab is processed by kneading is avoided. Meanwhile, a manner of leading out the first tab 21 and the second tab 22 from one end improves a space utilization rate of the cylindrical battery and further improves an energy density of the cylindrical battery.

When the cylindrical battery is charged and discharged, the first tab 21 and the second tab 22 easily reach an upper temperature limit. After analysis, it is found that the thickness of the tab does not match energy of the cylindrical battery. Therefore, in order to reduce an impact of the tab on the power performance of the cylindrical battery and thus improve charging and discharging performances of the cylindrical battery, the first tab 21 is made of an aluminum material, the thickness of the first tab 21 ranges from 0.2 mm to 0.6 mm. More specifically, in some embodiments, the thickness of the first tab 21 is 0.3 mm, 0.4 mm and 0.5 mm. The second tab 22 is made of a copper material, the thickness of the second tab 22 ranges from 0.2 mm to 0.6 mm. More specifically, in some embodiments, the thickness of the second tab 22 is 0.3 mm, 0.4 mm and 0.5 mm. When the thickness of the first tab 21 and the thickness of the second tab 22 are at the above values, conduction capacities of the first tab 21 and the second tab 22 are improved, and uneven stress on the cylindrical battery caused by an unreasonable tab thickness design is also able to be avoided, thereby avoiding an interface problem of the cylindrical battery. Moreover, the thickness of the first tab 21 and the thickness of the second tab 22 are such designed that welding of the first tab 21 and the second tab 22 to the current collector assembly 6 is also facilitated. If the thickness of the tab is too large, it is not prone to complete welding, resulting in poor firmness between the tab and the current collector assembly 6, and false welding is prone to occurring. If the thickness of the tab is too small, the power performance of the bare cell 1 may drop sharply.

In the embodiment of the disclosure, the thickness of the current collector assembly 6 ranges from 0.3 mm to 0.5 mm. More specifically, in some embodiments, the thickness of the current collector assembly 6 is 0.3 mm, 0.4 mm and 0.5 mm. The thickness of the current collector assembly 6 is such designed that, on the one hand, complete welding of the current collector assembly 6 and the tab is ensured and the current collector assembly 6 and the tab are effectively connected, and on the other hand, the thickness is able to effectively prevent a problem of welding through the current collector assembly 6 when the current collector assembly 6 and the cover plate assembly 5 are welded, thus reducing a probability of poor welding.

In some embodiments, before the current collector assembly 6 is welded, the first tab 21 and the second tab 22 located on an end face of the bare cell 1 are shaped by a flattening manner, so that the first tab 21 and the second tab 22 are shaped to form a stepped shape with a low center and high surroundings on the end face of the bare cell 1. When the first tab 21 and the second tab 22 are respectively placed in a tab flattening space of the corresponding flattening tool in a penetrating manner, under the flattening force of the flattening tool, the first tab 21 and the second tab 22 are spread directly above the bare cell 1, which is no need for kneading and other processing, thus avoiding a risk of metal debris generated by kneading.

In some embodiments, there is one current collector assembly 6, which is arranged at one end of the bare cell 1 in the axial direction. The current collector assembly 6 includes a first conductive portion 61*a*, a second conductive portion 61*b* and an insulating connection portion 61*c* arranged between the first conductive portion 61*a* and the second conductive portion 61*b*, and the first conductive portion 61*a*. The second conductive portion 61*b* and the insulating connection portion 61*c* are integrally molded. The current collector assembly 6 adopts an integrated structure, which reduces assemblies of the cylindrical battery and improves a space utilization rate of the cylindrical battery. Specifically, one of the first tab 21 and the second tab 22 is electrically connected to the first conductive portion 61*a*, and correspondingly, the other of the first tab 21 and the second tab 22 is electrically connected to the second conductive portion 61*b*, so that the polarity of the first conductive portion 61*a* is opposite to the polarity of the second conductive portion 61*b*. In order to prevent positive and negative electrodes from conducting with each other and causing a short circuit of the cylindrical battery, the insulating connection portion 61*c* is made of an insulating material to prevent the short circuit.

In some other embodiments, there are two current collector assemblies 6, which are arranged at two ends of the bare cell 1 in the axial direction, the first electrode plate and the second electrode plate respectively form the plurality of tabs at two ends of the bare cell 1 in the axial direction, and the first tab 21 and the second tab 22 are located at two ends of the bare cell 1. Such a design is able to effectively avoid the risk of the short circuit by a contact between the first tab and the second tab with opposite polarities.

In some embodiments, the insulating connection portion 61*c* is made of an insulating material, which is rubber, plastic, etc, and the plastic is Polybutylene terephthalate (PBT), Polyethylene terephthalate (PET), Polyamide (PA), etc.

Figure 6:
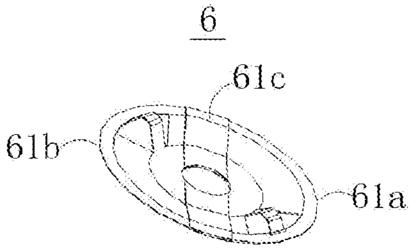
FIG. 6 is a structural schematic diagram of a current collector assembly according to an embodiment of the disclosure.

In some embodiments, after the tab is wound, a number of stacked layers of the outer ring tabs is relatively greater, and a number of stacked layers of the inner ring tabs is relatively less, so that compared with the inner ring tabs, the thickness of the outer ring tabs is greater than the thickness of the inner ring tabs. In order to increase a contact area between the tab and the current collector assembly 6, the first conductive portion 61*a* and the second conductive portion 61*b* both include a first annular plane 62*a*, a second annular plane 62*b* and an arc-shaped surface 62*c* connected between the first annular plane 62*a* and the second annular plane 62*b*. As shown in FIG. 6, the arc-shaped surface 62*c* is inclined, and the orthographic projection of the first annular plane 62*a* does not coincide with the orthographic projection of the second annular plane 62*b*. The current collector assembly 6 formed by the first annular plane 62*a*, the second annular plane 62*b* and the arc-shaped surface 62*c* is arc-shaped as a whole, that is, a trapezoidal structure with a certain slope from an edge of the current collector assembly 6 to a center of the current collector assembly 6. Such a design adapts to a shape of the wound tab, which facilitates a full contact between the tab and the current collector assembly 6, and is able to avoid false welding during welding.

Figure 7:
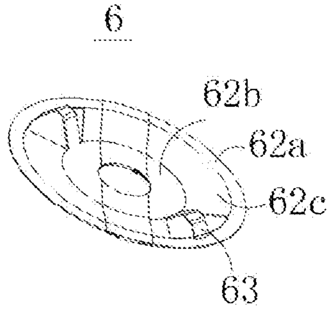
FIG. 7 is another structural schematic diagram of a current collector assembly according to an embodiment of the disclosure.
Figure 8:
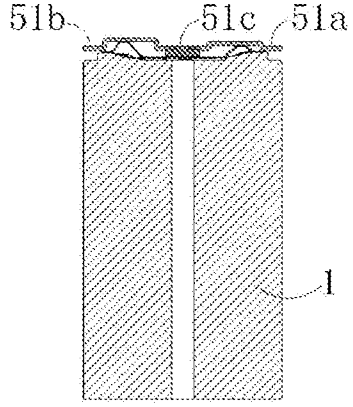
FIG. 8 is an assembly schematic diagram of a cover plate assembly and a bare cell according to an embodiment of the disclosure.

As shown in FIGS. 6-7, a surface, away from the bare cell, of the first conductive portion 61*a* and/or the second conductive portion 61*b* extend outward in part and protrude to form a convex body 63, and the convex body 63 is located in an area of the arc-shaped surface 62*c*. Correspondingly, the cover plate assembly 5 includes a positive terminal 51*a*, a negative terminal 51*b* and a connecting piece 51*c* arranged between the positive terminal 51*a* and the negative terminal 51*b*, the positive terminal 51*a* and/or the negative terminal 51*b* protrude in part in a direction away from the bare cell to form a convex portion 52, the interior of which is hollow, and the convex portion 52 is matched with the convex body 63. Specifically, in some embodiments, the first conductive portion 61*a* and the second conductive portion 61*b* are both provided with the convex body 63. Correspondingly, corresponding areas of the positive terminal 51*a* and the negative terminal 51*b* are also provided with the convex portion 52 respectively, and the interior of the convex portion 52 is hollow. When the cylindrical battery is assembled, the convex portions 52 respectively located on the positive terminal 51*a* and the negative terminal 51*b* correspond to the convex bodies 63 located on the first conductive portion 61*a* and the second conductive portion 61*b* one by one, and then the cover plate assembly 5 covers the opening in the housing 4, so that the convex body 63 is accommodated in a hollow cavity of the convex portion 52 and abuts against the convex portion 52, and the two are mutually conducted. Such a structural design makes the current collector assembly 6 not rotate easily, making a structure of the cylindrical battery compact. In some other embodiments, only one of the first conductive portion 61*a* and the second conductive portion 61*b* is provided with the convex body 63, and correspondingly, only one convex portion 52 corresponding to the convex body 63 is arranged on the cover assembly.

In some embodiments, the connecting piece 51*c* is made of an insulating material, which is rubber, plastic, etc, and the plastic is PBT, PET, PA, etc.

Figure 5:
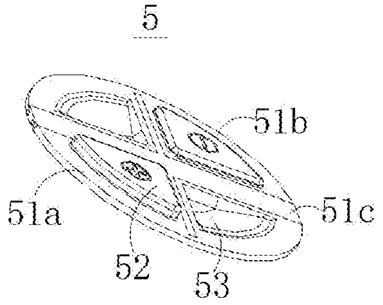
FIG. 5 is a structural schematic diagram of a cover plate assembly according to an embodiment of the disclosure.

As shown in FIG. 5, the positive terminal 51*a* and/or the negative terminal 51*b* are in part dented in a direction close to the bare cell to form a concave portion 53, and the concave portion 53 abuts against the arc-shaped surface 62*c*. In some embodiments, both the positive terminal 51*a* and the negative terminal 51*b* are provided with the concave portion 53, and the concave portion 53 is dented inwards from one surface, away from the bare cell 1, of the positive terminal 51*a* or the negative terminal 51*b* and protrudes outward on the other surface of the positive terminal 51*a* or the negative terminal 51*b*, thereby forming a concave area on one surface of the positive terminal 51*a* or the negative terminal 51*b*, and forming a protrusion on the other corresponding surface of the positive terminal 51*a* or the negative terminal 51*b*, which increases a contact area between the cover plate assembly 5 and the current collector assembly 6, reduces an internal resistance of a connection position, and reduces a loss.

In some embodiments, the positive terminal 51*a* is made of an aluminum material, the negative terminal 51*b* is made of a copper material, the housing 4 is made of a steel material, a sealing ring 7 of the cylindrical battery is made of an insulating material, and an injection port is sealed with a blind rivet. The thickness of the concave portion 53 ranges from 0.5 mm to 1.0 mm. The thickness ensures connection strength of the cover plate assembly 5 and meanwhile facilitates a welding of the concave portion 53 and the current collector assembly 6.

Figure 9:
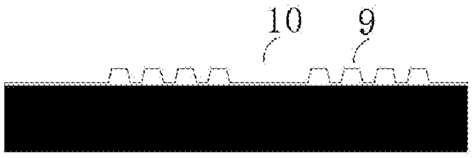
FIG. 9 is a schematic diagram of die-cutting of an electrode plate according to an embodiment of the disclosure.
Figure 10:
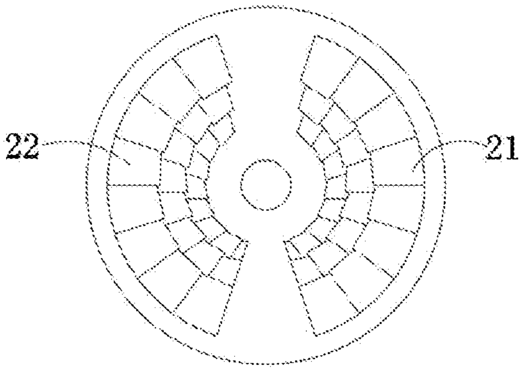
FIG. 10 is an end view of a bare cell according to an embodiment of the disclosure.

The disclosure also provides an assembly method of a cylindrical battery, which includes the following steps:

(1) Laser cutting of a tab: an electrode plate is die-cut into a shape shown in FIG. 9 by laser die-cutting. The electrode plate includes a plurality of tab areas 9 and a plurality of non-tab areas 10. A first non-tab area 10 of the plurality of non-tab areas 10 is close to a starting position of the electrode plate and is also a feeding position for winding, and so forth, a second non-tab area 10, a third non-tab area 10 . . . an nth non-tab area 10. The plurality of tab areas 9 and the plurality of non-tab areas 10 are arranged alternately. The tabs in the plurality of tab areas 9 maintain a certain distance from each other, the distance is 1 mm to 20 mm, and at least one tab is arranged in each of the plurality of tab areas 9. During die-cutting, the tab is flattened by a flattening tool.

(2) Winding: winding die-cut positive and negative plates and a separator to form the bare cell 1. After winding, the first tab 21 and the second tab 22 of the bare cell 1 are located on the left and right sides of the same end of the bare cell 1. During winding, the first tab 21 and the second tab 22 are flattened by the flattening tool, so that the first tab 21 and the second tab 22 are respectively inclined towards the inside of the bare cell 1, and meanwhile, a layer of insulating glue is wrapped outside of the bare cell 1 after winding.

(3) Tab shaping: the tab is spread to the inside of the bare cell 1 by the flattening tool and kept downward at the same time, and a shaped tab is shown in FIG. 4.

(4) Gluing of the tab: a layer of insulating glue is pasted to a middle position between the first tab 21 and the second tab 22 to prevent a contact between the first tab 21 and the second tab 22 from causing a short circuit.

(5) Welding of the tab and the current collector assembly 6: the current collector assembly 6 is aligned and placed at an end, provided with the tab, of the bare cell 1, the first conductive portion 61*a* of the current collector assembly 6 is in contact with the first tab 21, and the second conductive portion 61*b* of the current collector assembly 6 is in contact with the second tab 22. During welding, the current collector assembly 6 and the tab are pressed together by a clamp so that the two are in full contact with each other to ensure no gap in the middle, and then a laser heat conduction welding is adopted. Specifically, a selected laser is a blue laser or a green laser with a power of 1,500 W to 3,000 W. Laser pulse welding or continuous welding is also adopted. In some embodiments, a continuous welding with the blue laser is adopted, a welding power of the continuous welding is 800 W to 2,000 W, and a welding speed is 10 mm/s to 50 mm/s.

(6) Insertion and slot rolling: putting the bare cell 1 with the current collector assembly 6 welded into the housing 4, and the housing 4 is processed by slot rolling, so that a groove is formed in the housing 4 to fix the bare cell 1 and stop the bare from moving.

(7) Pier sealing: the cover plate assembly 5 inserted into a sealing ring 7 and the housing 4 are pier sealed.

(8) Welding of the cover plate assembly 5 and the current collector assembly 6: laser welding is adopted for welding, that is, the laser penetrates the cover plate assembly 5, so that the cover plate assembly 5 and the current collector assembly 6 are welded together to realize electrical connection. Before welding, a concave portion of the cover plate assembly is in contact with the current collector assembly 6, and then is welded after being pressed by the clamp. In some embodiments, a ring spot laser is for welding, that is, a laser power of a center beam is 2,000 W to 4,000 W, and a laser power of an outer beam is 1,000 W to 3,000 W.

(9) After being assembled, the bare cell 1 is subjected to high-temperature baking, liquid injection, standing, forming, aging and other processes.

(10) Sealing of an injection port: the injection port is sealed with a blind rivet, as shown in FIG. 3.

In addition, it should be understood that although the specification is described according to the embodiments, not each embodiment only includes an independent technical solution, and this description in the specification is only for the sake of clarity. Those skilled in the art shall regard the specification as a whole. The technical solutions in the various embodiments can also be properly combined to form other embodiments that can be understood by those skilled in the art.

According to the disclosure and teaching of the above specification, those skilled in the art to which the disclosure pertains can also change and modify the above embodiments. Therefore, the disclosure is not limited to the above specific embodiments, and any obvious improvement, substitution or modification made by those skilled in the art on the basis of the disclosure shall fall within the protection scope of the disclosure. In addition, although some specific terms are used in the specification, these terms are only for convenience of description and do not constitute any limitation to the disclosure.

What is claimed is:

1. A cylindrical battery, comprising:

a housing, at least one end of the housing is provided with an opening;

one cover plate assembly that covers the opening and is connected to the housing in a sealed manner;

a bare cell, the bare cell is arranged inside the housing, the bare cell is formed into a cylinder by stacking and winding a first electrode plate, a separator and a second electrode plate, and the polarity of the first electrode plate is opposite to the polarity of the second electrode plate, the cylinder has a radial direction and an axial direction, at least one of the first electrode plate and the second electrode plate forms a plurality of tabs at at least one end of the cylinder in the axial direction, the plurality of tabs are arranged in the axial direction, and each of the plurality of tabs is provided with at least one die-cutting line so that each of the plurality of tabs is formed with a plurality of sub-tabs, the plurality of tabs are bent and flattened in the radial direction, and the plurality of sub-tabs of two adjacent tabs of the plurality of tabs are arranged in a staggered manner; and one current collector assembly that is correspondingly arranged at one or two ends of the bare cell in an axial direction; the plurality of tabs comprises a first tab and a second tab, the first electrode plate of the bare cell is provided with the first tab; and the second electrode plate of the bare cell is provided with the second tab;

both the first electrode plate and the second electrode plate form the plurality of tabs close to one end of the one cover plate assembly, and the first tab and the second tab are located at the same end of the bare cell;

the one current collector assembly, which is arranged at one end of the bare cell in the axial direction, the one current collector assembly comprises a first conductive portion and a second conductive portion, the first conductive portion is connected to the first tab, and the second conductive portion is connected to the second tab;

the first conductive portion and the second conductive portion both comprise a first annular plane, a second annular plane and an arc-shaped surface connected between the first annular plane and the second annular plane, the arc-shaped surface is inclined, and an orthographic projection of the first annular plane does not coincide with an orthographic projection of the second annular plane.

2. The cylindrical battery according to claim 1, wherein the one current collector assembly further comprises an insulating connection portion arranged between the first conductive portion and the second conductive portion.

3. The cylindrical battery according to claim 1, wherein a surface, away from the bare cell, of the first conductive portion and/or the second conductive portion extends outward in part and protrudes to form a convex body, and the convex body is located in an area of the arc-shaped surface.

4. The cylindrical battery according to claim 3, wherein the one cover plate assembly comprises a positive terminal, a negative terminal and a connecting piece arranged between the positive terminal and the negative terminal, the positive terminal and/or the negative terminal protrude in part in a direction away from the bare cell to form a convex portion, the interior of which is hollow, and the convex portion is matched with the convex body.

5. The cylindrical battery according to claim 4, wherein the positive terminal and/or the negative terminal are in part dented in a direction close to the bare cell to form a concave portion, and the concave portion abuts against the arc-shaped surface.

6. The cylindrical battery according to claim 5, wherein a thickness of the concave portion ranges from 0.5 mm to 1 mm.

7. The cylindrical battery according to claim 1, wherein the first tab is located in a first area, the second tab is located in a second area, and an insulating part is arranged between the first area and the second area.

8. The cylindrical battery according to claim 7, wherein a gap portion is formed between the first area and the second area, the gap portion extends in the radial direction of the bare cell, and the insulating part is arranged in the gap portion.

9. The cylindrical battery according to claim 7, wherein the insulating part is an insulating glue bonded between the first area and the second area.

10. The cylindrical battery according to claim 1, wherein a thickness of the first tab ranges from 0.2 mm to 0.6 mm; and/or a thickness of the second tab ranges from 0.2 mm to 0.6 mm; and/or a thickness of the one current collector assembly ranges from 0.3 mm to 0.5 mm.

11. The cylindrical battery according to claim 1, wherein the first tab and the second tab are respectively inwards flattened in the radial direction of the bare cell, and are arranged in a stepped shape in the radial direction of the bare cell.

12. The cylindrical battery according to claim 1, wherein between any two adjacent tabs of the plurality of tabs, the layer of tab close to a circle center of the cylinder is below the layer of tab away from the circle center of the cylinder.

13. An assembly method of the bare cell according to claim 1, comprising:

when die-cutting the plurality of tabs, flattening the plurality of tabs so that the plurality of tabs are inclined to one side and forms an angle with electrode plates; and stacking and winding the first electrode plate, the separator and the second electrode plate to form the cylinder, bending and flattening the plurality of tabs in the radial direction of the cylinder to form the plurality of tabs, and the plurality of tabs are arranged in the axial direction, each of the plurality of tabs is provided with the at least one die-cutting line so that each of the plurality of tabs is formed with the plurality of sub-tabs, and the plurality of sub-tabs of two adjacent tabs of the plurality of tabs are arranged in the staggered manner.

* * * * *